(No Model.)
J. H. RANSOM, Jr.
NUT LOCK.
No. 541,628. Patented June 25, 1895.
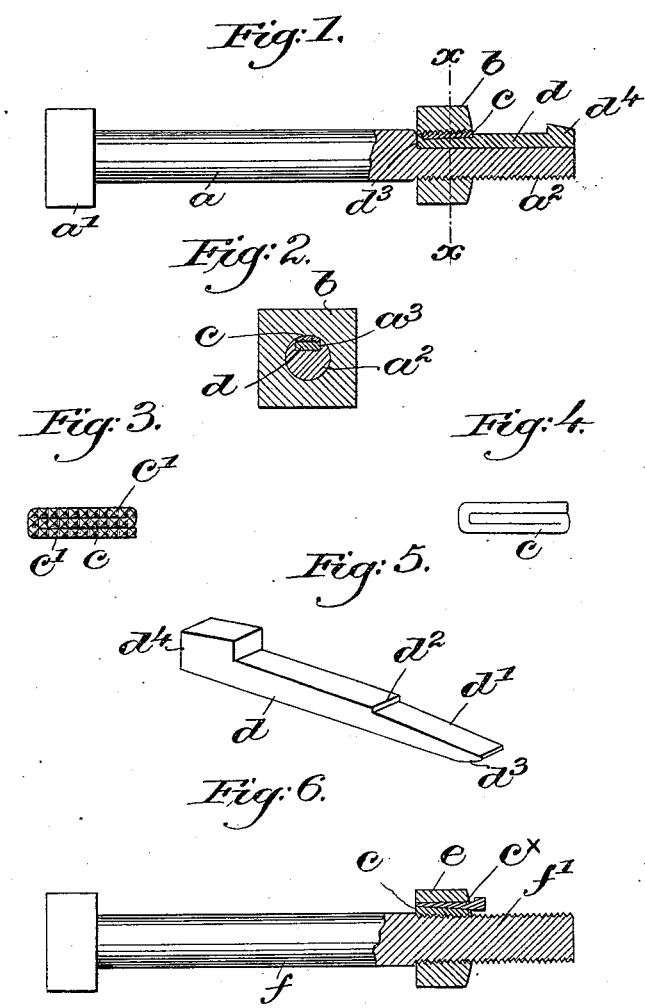

UNITED STATES PATENT OFFICE.

JONATHAN H. RANSOM, JR., OF WEST BRIGHTON, NEW YORK.

NUT-LOCK.

SPECIFICATION forming part of Letters Patent No. 541,628, dated June 25, 1895.

Application filed April 24, 1895. Serial No. 546,958. (No model.)

*To all whom it may concern:*

Be it known that I, JONATHAN H. RANSOM, Jr., of West Brighton, county of Richmond, State of New York, have invented an Improvement in Nut-Locks, of which the following description, in connection with the accompanying drawings, is a specification, like letters on the drawings representing like parts.

This invention has for its object the production of a simple, cheap and very efficient nut lock, which can be readily applied and which will securely lock the nut in place.

In carrying out my invention I provide the bolt, or it may be the nut, with a longitudinal groove or channel, into which, after the nut is turned upon the screw thread of the bolt, I apply a locking device composed of a wire bent upon itself in a plane and forming an engaging member, preferably notched or serrated upon one side, to engage the threads of the nut or bolt, as the case may be, and a key or wedge to enter the groove or channel and act upon the other side of the engaging wire, substantially as will be described.

Figure 1 in side elevation and partially in section represents a bolt and nut with one form of locking device embodying my invention applied thereto. Fig. 2 is a transverse sectional view thereof taken on the line $x\ x$, Fig. 1. Fig. 3 is a top view of a serrated or notched engaging member of the locking device. Fig. 4 is an under side view thereof. Fig. 5 is a perspective view, on a larger scale, of the retaining member or key of the locking device; and Fig. 6 is a view in partial elevation and section of a modification to be described.

My invention is applicable for locking nuts on bolts used in connection with railroad rails, and for other purposes.

Referring to Figs. 1 and 2, the bolt $a$, having a head $a'$ and a threaded shank $a^2$, is longitudinally grooved or channeled at $a^3$ for a distance equal to the length of the threaded portion.

The nut $b$, of usual construction, is turned on the threaded portion $a^2$ of the bolt to the point at which it is to be locked, and the engaging member $c$ of the locking device, see Figs. 1 to 4 inclusive, is inserted in the groove or channel $a^3$, within the nut, and resting on the tapering surface $d'$ of the retaining member $d$, shown separately in Fig. 5.

As shown in Figs. 3 and 4 the engaging member $c$ is shown as a piece of wire, preferably bent upon itself one or more times, according to the size desired therefor, and preferably I score or serrate its upper or engaging surface, as at $c'$, Fig. 3, to engage the threads of the nut, although if desired the wire may be plain on both sides, the threads cutting thereinto when the engaging member is forced against them by the key or wedge $d$, in either case the nut being locked firmly in place.

The locking member $d$ rests in the groove or channel described, and it is shouldered at $d^2$ to prevent longitudinal movement of the member $c$, resting on the adjacent tapering surface $d'$.

It will be obvious that when the key is driven home the engaging member $c$ will be lifted and forced with great power into engagement with the threads of the nut, and, as shown in Fig. 1, the key may be driven in far enough to upset its end against the end wall of the groove or channel $a^3$, and back of the engaging member.

To facilitate upsetting, the end or tip of the locking member may be reduced, as at $d^3$, Fig. 5, and preferably the key is provided with a head or shoulder $d^4$, to be struck or engaged by a hammer or otherwise when it is desired to withdraw it.

In the modification shown in Fig. 6 the nut $e$ is grooved or channeled interiorly to receive the engaging member $c$, which in this instance engages the threads $f'$ of the bolt $f$, a locking member or wedge $c^\times$ driven into the groove or channel between the bottom thereof and the engaging member $c$ forcing the latter into the threads of the bolt.

If the engaging member $c$ is serrated on one side, as shown at $c'$, the serrations may be more or less sharp, and made in any suitable manner.

I claim—

1. A bolt, and its nut, a retaining member to enter a groove or channel in one and having a tapering end, and an engaging member formed of a wire bent upon itself in a plane and serrated on one side to engage the threads of the other, the said engaging member being forced into place by the tapering retaining member inserted against its smooth side, substantially as described.

2. A bolt having a longitudinal groove in its threaded portion, a nut, an engaging member formed of a wire bent upon itself in a plane, and a retaining member adapted to be inserted in the groove of the bolt beneath the wire to force it into engagement with the threads of the nut, the reduced end of the retaining member being adapted to be upset by the bolt, substantially as described.

3. A nut lock comprising a thread engaging member formed of a wire bent upon itself in a plane and scored or serrated, and a retaining member having a tapering surface and a shoulder to co-operate with and force said engaging member into operative position, and to retain it in place by the shoulder, substantially as described.

In testimony whereof I have signed my name to this specification in the presence of two subscribing witnesses.

JONATHAN H. RANSOM, JR.

Witnesses:
F. L. MOON,
FRANK CURTIS.